United States Patent
DelGaudio et al.

(10) Patent No.: US 8,037,140 B2
(45) Date of Patent: Oct. 11, 2011

(54) SYSTEM, METHOD AND PROGRAM PRODUCT FOR MANAGING COMMUNICATIONS PURSUANT TO AN INFORMATION TECHNOLOGY (IT) MIGRATION

(75) Inventors: Carol I. DelGaudio, Williston, VT (US); Anne M. Henderson, Essex Junction, VT (US); Scott D. Hicks, Underhill Center, VT (US); Victoria A. Locke, Newburgh, NY (US); James A. Martin, Jr., Endicott, NY (US); Donald P. Mummey, Omaha, NE (US); Douglas G. Murray, Johnson City, NY (US); Jeffrey E. Prince, Bloomfield Hills, MI (US); Diane C. Rauch, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 1256 days.

(21) Appl. No.: 11/096,002

(22) Filed: Mar. 31, 2005

(65) Prior Publication Data

US 2006/0224676 A1    Oct. 5, 2006

(51) Int. Cl.
*G06F 15/16* (2006.01)
(52) U.S. Cl. .................. 709/206; 709/204
(58) Field of Classification Search ............ 709/206
See application file for complete search history.

(56) References Cited

U.S. PATENT DOCUMENTS

| | | | |
|---|---|---|---|
| 5,208,748 A | 5/1993 | Flores et al. | |
| 5,678,044 A | 10/1997 | Pastilha et al. | |
| 5,754,939 A | 5/1998 | Herz et al. | |
| 5,918,158 A | 6/1999 | LaPorta et al. | |
| 5,930,806 A | 7/1999 | Taira et al. | |
| 6,047,129 A | 4/2000 | Frye | |
| 6,088,722 A | 7/2000 | Herz et al. | |
| 6,269,382 B1 | 7/2001 | Cabrera et al. | |
| 6,353,926 B1 * | 3/2002 | Parthesarathy et al. | 717/170 |
| 6,460,036 B1 | 10/2002 | Herz | |
| 6,480,885 B1 | 11/2002 | Olivier | |
| 6,496,977 B1 | 12/2002 | Hamilton, II et al. | |
| 6,615,166 B1 | 9/2003 | Guheen et al. | |
| 6,728,877 B2 | 4/2004 | Mackin et al. | |

(Continued)

OTHER PUBLICATIONS

DelGaudio et al., "Office Action Communication," Mar. 5, 2009, 16 pages.

(Continued)

*Primary Examiner* — Jeffrey Pwu
*Assistant Examiner* — Shaq Taha
(74) *Attorney, Agent, or Firm* — Hoffman Warnick LLC; William Schiesser

(57) ABSTRACT

Under the present invention, a distribution list of message recipients within an organization undergoing the IT migration is generated by analyzing the infrastructure of the organization. Once the message recipients are known, they can be grouped into a set of mailing groups. Thereafter, specific message templates can be assigned to each group, and a schedule for sending messages to the message recipients can be set. Messages will then be generated and sent to the message recipients using the message templates assigned to their respective mailing group(s) and the schedule. Responses to the messages will be tracked and processed, and records associated with the message recipients will be updated based thereon. Follow-up messages containing additional questions and/or instructions can be generated and sent using any data that is contained in the responses. Also, "non-responses" can be tracked so that reminder messages can be sent.

8 Claims, 2 Drawing Sheets

U.S. PATENT DOCUMENTS

| | | | |
|---|---|---|---|
| 6,795,835 | B2 | 9/2004 | Ricart et al. |
| 6,856,240 | B1 | 2/2005 | Elswick et al. |
| 7,133,901 | B1 | 11/2006 | Dalby et al. |
| 7,146,412 | B2* | 12/2006 | Turnbull ............... 709/220 |
| 7,225,195 | B2 | 5/2007 | Avrahami et al. |
| 2001/0032210 | A1* | 10/2001 | Frank et al. ............ 707/104.1 |
| 2001/0034769 | A1* | 10/2001 | Rast ............... 709/206 |
| 2002/0069213 | A1 | 6/2002 | Moslander et al. |
| 2002/0087404 | A1 | 7/2002 | Silkey et al. |
| 2002/0087646 | A1* | 7/2002 | Hickey et al. ............ 709/206 |
| 2002/0099633 | A1 | 7/2002 | Bray |
| 2002/0099775 | A1* | 7/2002 | Gupta et al. ............ 709/205 |
| 2002/0146096 | A1* | 10/2002 | Agarwal et al. ........ 379/88.13 |
| 2003/0130980 | A1 | 7/2003 | Bell et al. |
| 2003/0167354 | A1 | 9/2003 | Peppers et al. |
| 2003/0185379 | A1 | 10/2003 | O'Connor et al. |
| 2004/0034577 | A1 | 2/2004 | Van Hoose et al. |
| 2004/0128203 | A1 | 7/2004 | Pierre et al. |
| 2004/0153512 | A1 | 8/2004 | Friend |
| 2004/0186889 | A1* | 9/2004 | Washburn ............... 709/206 |
| 2004/0194055 | A1 | 9/2004 | Galloway et al. |
| 2004/0267595 | A1* | 12/2004 | Woodings et al. ............. 705/9 |
| 2005/0055357 | A1 | 3/2005 | Campbell |
| 2005/0086457 | A1* | 4/2005 | Hohman ............... 713/1 |
| 2005/0125544 | A1 | 6/2005 | Zhao |
| 2006/0026012 | A1 | 2/2006 | Campbell |
| 2006/0095520 | A1* | 5/2006 | Berg ............... 709/206 |
| 2006/0168029 | A1* | 7/2006 | Fitzpatrick et al. ........ 709/206 |
| 2006/0182085 | A1* | 8/2006 | Sweeney et al. ............ 370/352 |
| 2006/0294561 | A1 | 12/2006 | Grannan et al. |
| 2007/0088630 | A1 | 4/2007 | MacLeod et al. |
| 2007/0136722 | A1 | 6/2007 | Lesher et al. |
| 2007/0250370 | A1 | 10/2007 | Partridge et al. |
| 2008/0288589 | A1 | 11/2008 | Ala-Pietila |

OTHER PUBLICATIONS

U.S. Appl. No. 11/464,903, filed Aug. 16, 2006, Notice of Allowance dated Aug. 13, 2009.

Brewer, "Improving Problem-Oriented Mailing List Archives with MCS", ICSE 2000, pp. 95-104, ACM 23000, Collaborative Software Development Laboratory, Department of Information and Computer Sciences, University of Hawaii.

Sakata et al., "Mailing List System Enabling Consummatory Communication", Oct. 2000, pp. 2762-2769, vol. 41, Issue 10, Transactions of the Information Processing Society of Japan.

Tsukamoto et al., "Design and Implementation of a Mail Distribution System Using Reasoning Mechanism for Dynamic Group Construction", Sep. 1996, pp. 735-743, vol. 11, Issue 5, J. of Japanese Society for Artificial Intelligence.

DelGaudio, U.S. Appl. No. 10/728,520, filed Dec. 4, 2003, Office Communication dated Mar. 18, 2008, 8 pages.

DelGaudio, U.S. Appl. No. 10/728,520, filed Dec. 4, 2003, Office Communication dated Aug. 20, 2008, 11 pages.

DelGaudio, U.S. Appl. No. 10/728,520, filed Dec. 4, 2003, Office Communication dated Mar. 17, 2009, 12 pages.

DelGaudio, U.S. Appl. No. 10/728,520, filed Dec. 4, 2003, Notice of Allowance and Fee(s) Due dated Oct. 30, 2009, 16 pages.

DelGaudio, U.S. Appl. No. 11/186,211, filed Jul. 21, 2005, Office Communication dated Aug. 11, 2008, 7 pages.

DelGaudio, U.S. Appl. No. 11/186,211, filed Jul. 21, 2005, Office Communication dated Jan. 5, 2009, 9 pages.

DelGaudio, U.S. Appl. No. 11/186,211, filed Jul. 21, 2005, Office Communication dated Jun. 4, 2009, 10 pages.

DelGaudio, U.S. Appl. No. 11/186,211, filed Jul. 21, 2005, Notice of Allowance and Fee(s) Due dated Dec. 29, 2009, 8 pages.

Cox, Office Communication for U.S. Appl. No. 11/215,755 dated Apr. 14, 2010, 11 pages.

Cox, Office Communication for U.S. Appl. No. 11/215,755 dated Sep. 8, 2010, 16 pages.

U.S. Appl. No. 11/215,755, filed Aug. 30, 2005, Office Action dated Feb. 17, 2011.

* cited by examiner

SYSTEM, METHOD AND PROGRAM PRODUCT FOR MANAGING COMMUNICATIONS PURSUANT TO AN INFORMATION TECHNOLOGY (IT) MIGRATION

CROSS-REFERENCE TO RELATED APPLICATIONS

The present invention is related in some aspect to the commonly owned co-pending application Ser. No. 11/215,755 entitled "Method, System and Program Product for Performing an Integrated IT Migration and Inventory Information Collection," herein incorporated by reference. The present invention is also related in some aspect to the commonly owned co-pending application identified by application Ser. No. 10/728,520, filed Dec. 4, 2003 and entitled "Method and System for Enterprise-Wide Migration," herein incorporated by reference.

BACKGROUND OF THE INVENTION

1. Field of the Invention

In general, the present invention relates to communications management. Specifically, the present invention relates to a system, method and program product for managing communications such as pursuant to an Information Technology (IT) migration.

2. Related Art

As Information Technology (IT) continues to advance, many organizations are faced with the task of migrating their existing computer infrastructures, telephone systems and the like to newer technology. For example, an organization might wish to migrate its networking functions from token ring to Ethernet. Similarly, an organization might wish to migrate its telephone service from landline-based service to voice-over-IP service. To accomplish the desired migration, an organization will often hire an outside service-provider that will gather needed information and perform the actual migration.

Unfortunately, performing IT migrations such as these this have historically been extremely expensive and labor-intensive processes. Specifically, IT migrations prior to the present invention necessitated numerous physical visits, telephone calls, and individual electronic mail messages for announcements, gathering of information and scheduling the actual migration. Unfortunately, this approach has several problems. For example, a variation in individual's schedules creates problems in gathering the needed information, and often requires several physical visits. In addition, the actual migration is usually delayed since performing the migration typically requires that representatives of the organization be present while the service provider is on site. Still yet, it is time consuming to place telephone calls or send electronic mail messages to every customer to set up an appointment for a visit. Even if mass mailing templates are used, there is no existing system that can manage the communications and between the service provider and the organization. For example, no existing system tracks responses or non-responses, sends follow-up messages with additional instructions based on the data returned with a response, takes appropriate actions to address non-responses, and transfers data contained in the responses to the appropriate databases or applications.

In view of the foregoing, there exists a need for a system, method and program product for managing communications such as pursuant to an IT migration. Specifically, a need exists for a system that is capable of managing messages communicated between an organization and a service provider performing the IT migration such that efficiency is maximized and costs associated with the IT migration are reduced.

SUMMARY OF THE INVENTION

In general, the present invention provides a system, method and program product for managing communications such as pursuant to an IT migration. Specifically, under the present invention, a distribution list of message recipients within an organization undergoing the IT migration is generated. This is typically accomplished by analyzing the infrastructure of the organization. For example, the distribution list can be generated by analyzing the organization's electronic mail directory, existing telephone switch, electronic company directory, etc. Once the message recipients are known, they can be grouped into a set (one or more) of mailing groups. Thereafter, specific message templates can be assigned to each group, and a schedule for sending messages to the message recipients can be configured/set. Messages will then be generated and sent to the message recipients using the message templates assigned to their respective mailing group(s) and the schedule. Any responses to the messages that are received will be tracked and processed, and records associated with the message recipients will be updated based thereon. The present invention also provides for follow-up messages containing additional instructions to be generated and sent using any data that is contained in the responses. Still yet, the present invention tracks "non-responses" so that reminder messages can be sent to the message recipients and/or their managers.

A first aspect of the present invention provides a system for managing communications, comprising: means for analyzing an infrastructure of an enterprise to generate a distribution list of message recipients; means for grouping the message recipients into a set of mailing groups; means for assigning message templates to the set of mailing groups; means for configuring a schedule for sending messages to the message recipients; means for generating and sending the messages to the message recipients based on their assigned message templates and the schedule; means for tracking and processing responses to the messages; and means for updating records associated with the message recipients based on the responses.

A second aspect of the present invention provides a method for managing communications, comprising: analyzing an infrastructure of an enterprise to generate a distribution list of message recipients; grouping the message recipients into a set of mailing groups; assigning message templates to the set of mailing groups; configuring a schedule for sending messages to the message recipients; generating and sending the messages to the message recipients using the templates assigned to their respective mailing groups and the schedule; tracking and processing responses to the messages; and updating records associated with the message recipients based on the responses.

A third aspect of the present invention provides a program product stored on a computer readable medium for managing communications, the computer readable medium comprising program code for performing the following steps: analyzing an infrastructure of an enterprise to generate a distribution list of message recipients; grouping the message recipients into a set of mailing groups; assigning message templates to the set of mailing groups; configuring a schedule for sending messages to the message recipients; generating and sending the messages to the message recipients based on their assigned message templates and the schedule; tracking and processing responses to the messages; and updating records associated with the message recipients based on the responses.

A fourth aspect of the present invention provides a method for deploying an application for managing communications, comprising: providing a computer infrastructure being operable to: analyze an infrastructure of an enterprise to generate a distribution list of message recipients; group the message recipients into a set of mailing groups; assign message templates to the set of mailing groups; configure a schedule for sending messages to the message recipients; generate and send the messages to the message recipients based on their assigned message templates and the schedule; track and processing responses to the messages; and update records associated with the message recipients based on the responses.

A fifth aspect of the present invention provides computer software embodied in a propagated signal for deploying an application for managing communications, the computer software comprising instructions to cause a computer system to perform the following functions: analyze an infrastructure of an enterprise to generate a distribution list of message recipients; group the message recipients into a set of mailing groups; assign message templates to the set of mailing groups; configure a schedule for sending messages to the message recipients; generate and send the messages to the message recipients based on their assigned message templates and the schedule; track and processing responses to the messages; and update records associated with the message recipients based on the responses.

Therefore, the present invention provides a system, method and program product for managing communications.

BRIEF DESCRIPTION OF THE DRAWINGS

These and other features of this invention will be more readily understood from the following detailed description of the various aspects of the invention taken in conjunction with the accompanying drawings in which.

Figure 1:
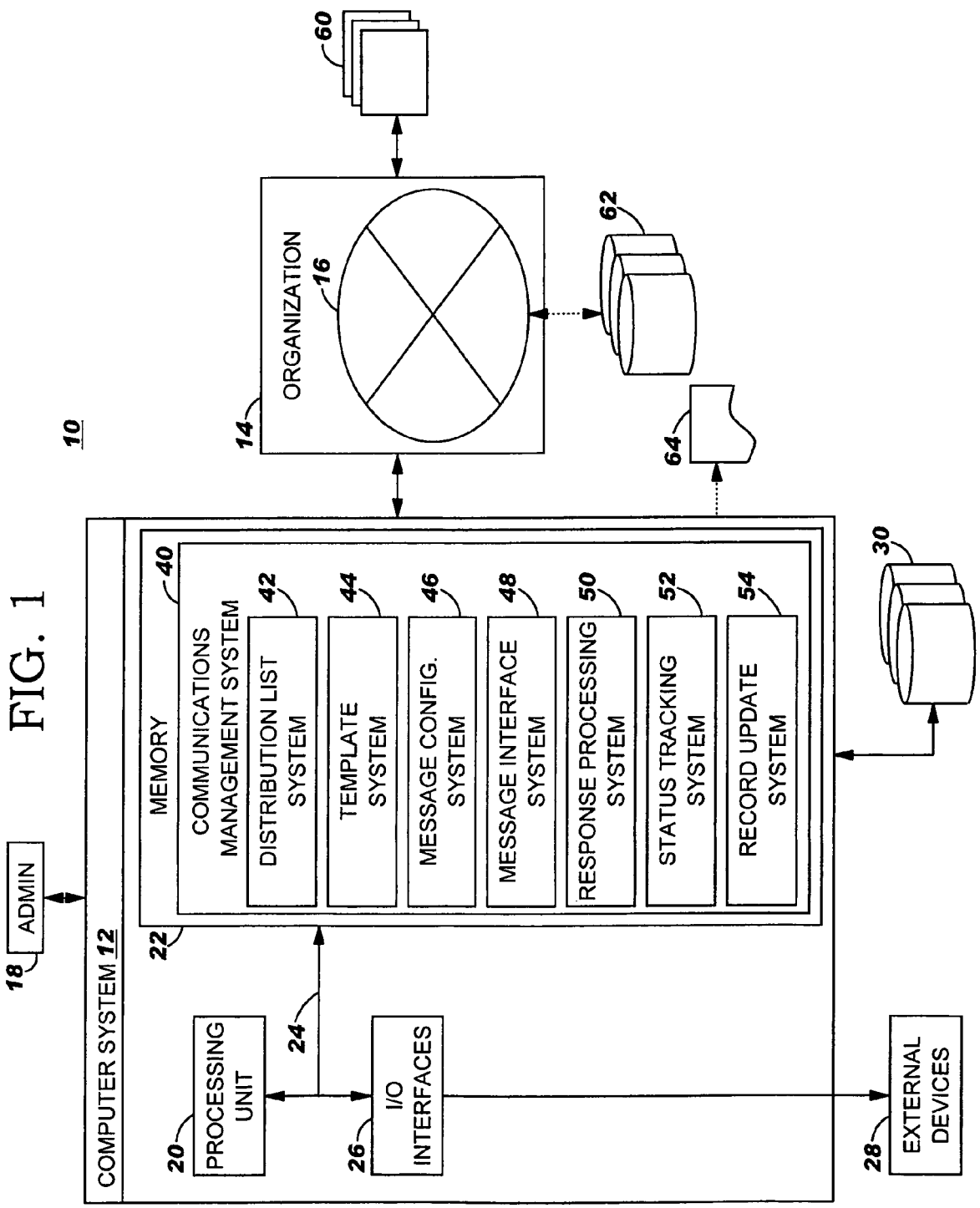
FIG. 1 depicts a system for managing communications such as pursuant to an IT migration according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

As indicated above, the present invention provides a system, method and program product for managing communications such as pursuant to an IT migration. Specifically, under the present invention, a distribution list of message recipients within an organization undergoing the IT migration is generated. This is typically accomplished by analyzing the infrastructure of the organization. For example, the distribution list can be generated by analyzing the organization's electronic mail directory, existing telephone switch, electronic company directory, etc. Once the message recipients are known, they can be grouped into a set (one or more) of mailing groups. Thereafter, specific message templates can be assigned to each group, and a schedule for sending messages to the message recipients can be configured/set. Messages will then be generated and sent to the message recipients using the message templates assigned to their respective mailing group(s) and the schedule. Any responses to the messages that are received will be tracked and processed, and records associated with the message recipients will be updated based thereon. The present invention also provides for follow-up messages containing additional instructions to be generated and sent using any data that is contained in the responses. Still yet, the present invention tracks "non-responses" so that reminder messages can be sent to the message recipients and/or their managers.

Referring now to FIG. 1, a system 10 for managing communications according to the present invention is shown. As depicted, system 10 includes computer system 12, which is in communication with organization 14. Computer system 12 is intended to represent any type of computer system or computer infrastructure capable of carrying out the teachings of the present invention. For example, computer system 12 could be a laptop computer, a desktop computer, a workstation, a handheld device, etc. In addition, as will be further described below, computer system 12 can be deployed and/or operated by a service provider such as one that is performing the IT migration for organization 14, or that is managing communications that occur pursuant to the IT migration. Organization 14 is intended to represent any type of individual, group of individuals, company, etc. that is experiencing an IT migration. Examples of IT migrations include, among others, migration of networking functions from token ring to Ethernet, migration of telephone service from landline-based service to voice-over-IP service, etc.

As further depicted, organization 14 includes infrastructure 16, that is intended to represent any type of IT or computerized infrastructure/environment that may be implemented by organization 14. For example, infrastructure 16 can contain hardware (e.g., computer systems, networking components, telephone components, etc.), software (e.g., applications, server software, client software, etc.), or any combination thereof. In addition, infrastructure 16 can contain or communicate with directories 62 for organization 14 such as an electronic mail directory, a telephone switch/directory, an electronic company directory, etc.

In any event, under the present invention, the communications occurring between computer system 12 and organization 14 will be managed using communications management system 40, which is shown implemented on computer system 12 as computer program code. To this extent, computer system 12 is shown including a processing unit 20, a memory 22, a bus 24, and an input/output (I/O) interface 26. Further, computer system 14 is shown in communication with an external I/O devices/resources 28 and one or more storage systems 30. In general, processing unit 20 executes computer program code, such as communications management system 40, which is stored in memory 22 and/or storage system(s) 30. While executing computer program code, processing unit 20 can read and/or write data, to/from memory 22, storage system(s) 30, and/or I/O interface 26. Bus 24 provides a communication link between each of the components in computer system 12. I/O devices 28 can comprise any devices (e.g., keyboard, pointing device, display, etc.) that enables a user to interact with computer system 12 and/or any devices (e.g., network card, modem, etc.) that enable computer system 12 to communicate with one or more other computing devices, such as those in organization 14.

Communications between computer system 12 and organization 14 can occur over one or more networks. Such a network can comprise any combination of various types of communications links. For example, the network can comprise addressable connections that may utilize any combination of wired and/or wireless transmission methods. Further, the network can comprise one or more of any type of network, including the Internet, a wide area network (WAN), a local area network (LAN), a virtual private network (VPN), etc. Where communications occur via the Internet, connectivity could be provided by conventional TCP/IP sockets-based protocol, and a computing device could utilize an Internet service provider to establish connectivity to the Internet.

Computer system 12 is only representative of various possible computer infrastructures that can include numerous combinations of hardware. For example, processing unit 20 may comprise a single processing unit, or be distributed across one or more processing units in one or more locations, e.g., on a client and server. Similarly, memory 22 and/or storage system 30 can comprise any combination of various types of data storage and/or transmission media that reside at one or more physical locations. Further, I/O interface 26 can comprise any system for exchanging information with one or more I/O devices 28. Still further, it is understood that one or more additional components (e.g., system software, math co-processing unit, etc.) not shown in FIG. 1 can be included in computer system 12. However, if computer system 12 comprises a handheld device or the like, it is understood that one or more I/O devices 28 (e.g., a display) and/or storage system(s) 30 could be contained within computer system 12, not externally as shown.

As will be further described below, storage system(s) 30 can be any type of systems (e.g., databases) capable of providing storage for information (e.g., message configuration details, message templates, distribution lists, message response statuses, etc.) under the present invention. In a typical embodiment, each organization 14 undergoing an IT migration will be assigned their own set of storage system(s) 30. That is, the storage system(s) 30 for organization "A" will be maintained separate and distinct from those of organization "B." Moreover, in a typical embodiment, two storage system(s) 30 will be created and assigned for each organization. One storage system could contain message and status information, while the other could contain actual data received in responses from message recipients 60. It should be understood, however, that this need not be the case. Rather, any quantity (e.g., one, three, etc.) of storage system(s) 30 could be assigned to each organization.

In any event, storage system(s) 30 could each include one or more storage devices, such as a magnetic disk drive or an optical disk drive. In another embodiment, storage system(s) 30 include data distributed across, for example, a local area network (LAN), wide area network (WAN) or a storage area network (SAN) (not shown). Although not shown, additional components, such as cache memory, communication systems, system software, etc., may be incorporated into computer system 12. Moreover, although not shown for brevity purposes, computer systems existing within infrastructure 16 of organization 14 will likely contain computerized components similar to computer system 12.

Shown in memory 22 of computer system 12 is communications management system 40, which includes distribution list system 42, template system 44, message configuration system 46, message interface system 48, response processing system 50, status tracking system 52 and record update system 54. Operation of each of these systems is discussed further below. However, it is understood that some of the various systems shown in FIG. 1 can be implemented independently, combined, and/or stored in memory for one or more separate computer systems 12 that communicate over a network. Further, it is understood that some of the systems/functionality may not be implemented and/or additional systems/functionality may be included as part of the present invention. Still yet, it is understood that the depiction of these systems shown in FIG. 1 is illustrative only and that the same functionality could be achieved with a different configuration. That is, the functionality of these systems could be combined into fewer systems, or broken down into additional systems.

ILLUSTRATIVE EXAMPLE

In an illustrative example, assume that organization 14 desires to migrate its networking functions from token ring to Ethernet on an enterprise-wide level. Before such a migration can occur, various pieces of information must be gathered. As discussed above, this generally involves communicating with the individuals within organization. In previous systems, this information gathering processed involved multiple physical visits to organization 14 as well as multiple rounds of communications with the individuals thereof. The present invention provides a way to automatically manage the communications as well as the information that is exchanged pursuant thereto.

Under the present invention, distribution list system 42 will first analyze infrastructure 16 of organization to generate a distribution list 64 of message recipients 60. In general, message recipients 60 are the individuals within organization 14 with who communications will be held to effect the IT migration. In a typical embodiment, the distribution list 64 will be generated by analyzing one or more directories 62 of organization 14 such as an electronic mail directory, a telephone switch, an electronic company directory, etc. However, it should be understood that any part of infrastructure 16 that could yield a distribution list 64 of message recipients 60 could be analyzed.

Once the distribution list 64 of message recipients 60 has been generated, it can be grouped into one or more (i.e., a "set") groups of message recipients. For example, it may be desirous to effect the IT migration by departments. As such, an administrator 18 or the like could use distribution list system 42, or instruct distribution list system 42 to group message recipients 60 into one or more groups.

Once the distribution list 64 of message recipients 60 has been generated, and grouped into one or more groups, template system 44 can be used to provide or generate message templates, as well as to assign message templates (or template groups) to certain message groups. Specifically, in one embodiment, template system 44 could provide various interfaces, tools and the like for administrator 18 to generate message templates, which are then stored for future use. In addition, template system 44 could provide an interface for loading previously generated message templates and/or retrieving previously generated templates from storage. In general, the message templates include specific questions and/or instructions for message recipients 60 to answer and/or follow. The messages generated from the message templates are typically electronic such as electronic mail messages, text messages, instant messages, short messages, etc.

In any event, once message templates are available, they can be assigned to the message groups. Assignment of message templates to groups of message recipients 60 allows the messages that are to be generated and sent to message recipients 60 to be specifically tailored, and thus, efficient for obtaining needed information. For example, group of message recipients "A" could be senior level management within organization 14, while group "B" could be junior level workers. As such, messages sent to group "A" might be high level or "big picture" messages, while those sent to group "B"

might be more specific such as seeking information pertaining to specific configuration of the workers' computer settings. Assigning message templates to message groups will allow the appropriate messages to be sent to the groups without duplicative effort being expended.

The assigning of message templates to groups is also an effective way to handle message template changes. For example, assume that group "C" begins receiving messages generated using an old version of the message templates, while group "D" begins receiving messages generated using a new version of the message templates. For continuity purposes it may be desirous for any follow-up messages sent to group "C" to also be generated using old message templates, while any follow-up messages sent to group "D" are generated using the new message templates. The assignment of message templates to groups under the present invention will most effectively provide this function.

After template assignment has been completed, administrator 18 can utilize message configuration system 46 to set a schedule(s) for sending original messages, follow-up messages and reminder messages. The schedule for an original message can be a date and time at which the original message should be sent. The schedule for sending a follow-up message can be a specific date and time, or a predetermined period of time after a response to an original message is received. The schedule for a reminder message can be a predetermined period of time within which a response to an original or a follow-up message is not received. The nature and use of each of these types of messages will be further discussed below. However, message configuration system 46 allows for schedules to be set at the organization 14 level, the group level and/or individual message recipient 60 level. In one embodiment, administrator 18 can manually set the schedule(s). In another embodiment, message configuration system 46 can utilize a previously set schedule(s), a configuration file(s), etc.

In any event, once configuration of the messages is complete, message interface system 48 will generate and send the messages to message recipients 60 using the templates assigned to their respective groups and the schedule(s) as set via message configuration system 46. Further assume in this example, that group "D" includes message recipients 60 shown in FIG. 1. Further assume that templates "1-3" have been assigned to this group, with template "1" being for an original message, template "2" being for a follow-up message, and template "3" being for a reminder message in the event that a response to an original message or a follow-up message is not received in a predetermined period of time. To this extent, message interface system 48 will first generate original messages for message recipients 60 using template "1." In a typical embodiment, message interface system 48 will generate an executable file, which when executed prompts the message recipients 60 to input some data (e.g., answer questions), or take some actions (e.g., instructions). In any event, the executable file will be packaged into the original messages that are sent message recipients 60 at the scheduled date and time. At this point status tracking system 52 can set the status for the messages in storage system(s) 30 to "pending" or the like.

Upon receipt, message recipients 60 will execute the executable files contained in the messages and input the requested data and/or take the instructed actions. The data input will be packaged into a response that is sent back to computer system 12 and received and processed by response processing system 50. In a typical embodiment, the responses are communicated to computer system 12 using file transfer protocol (FTP). As the response are received, response processing system 50 will process the data contained therein to, among other reasons, be able to appropriately instruct message interface system 48 so that a better, more tailored follow-up message can be generated if/when the time comes. In addition, as responses are received, record update system 54 will interface with storage system(s) to note their receipt (i.e., status changed to "response received"), while record update system 54 will transfer the data received in the responses to the appropriate storage system 30. To this extent, message recipients 60 will typically have one or more records in storage system(s) 30. The record(s) will not only be populated with the data received in the responses (as further described below), but will also contain a running status of the messages and their responses. In a typical embodiment, record update system 54 will make a batch transfer of the data received from message recipients 60 to the appropriate records. For example, when messages are sent to the messages recipients 60 within a particular group (e.g., group "D"), their responses are initially held on computer system 12. Record update system 54 could make scheduled transfers of the data from computer system 12 to the appropriate records of storage system 30 in batch to avoid having to make a voluminous number of storage system operations.

Status tracking system 52 is also provided under the present invention to track a status of the messages (and/or the responses) in the event that responses are not received within the scheduled predetermined period of time. That is, status tracking system 52 will track whether responses to original or follow-up messages are received within the scheduled period of time. This can be done by periodically monitoring the storage system 30 in which message status is maintained. For example, assume that administrator 18 scheduled a response time of three days. Further assume that message recipient "3" of group "D" failed to respond to the original message within three days. This deficiency would be detected by status tracking system 52, which could first change the status for message recipient "1" to "overdue" (or something similar). Thereafter, status tracking system 52 can interface with message interface system 48 to generate and send a reminder message to message recipient "1" and/or his/her managers. Based on the template assignment discussed above, this message would be sent using message template "3." Alternatively, reminder messages can be a generic message that is retrieved from storage/memory and sent. In such a case, there is no need to re-generate the reminder message. In addition, status tracking system 52 can also track the status of reminder messages. For example, if a reminder message is sent, and a response to the original message is not received within a predetermined period of time (e.g., as set via message configuration system 46) from the sending of the reminder message (or of the original message), additional step can be taken. Such steps could include, for example, an additional reminder message being sent to the overdue message recipient and/or his/her manager, a message being sent to administrator 18 to call the overdue message recipient and/or his/her manager, etc. Thus, the present invention allows for any number of reminders/status tracking mechanisms.

In any event, the present invention also allows follow-up messages to be generated and sent to message recipients 60. Such messages could be generated based on the data received in the responses to the original messages. For example, based on a message recipient's answers to questions contained in the original message, the follow-up message could ask additional questions and/or provide further instructions. To this extent, message interface system 48 will once again create executable file using the message template assigned to the follow-up messages (e.g., message template "2").

As indicated above, the data received in the responses was processed by response processing system 50 can be used to generate follow-up messages that are more tailored and efficiently addressed by message recipients 60. For example, assume that message template "2" contains fifty additional questions. However, based on his/her response to the original messages, only twenty of the questions are relevant for message recipient "2" (e.g., because user "2's" computer system has the Linux operating system as opposed to Windows). Response processing system 50 is configured to work with message interface system 48 so that only a subset (i.e., the relevant) of the questions will be included in the actual follow-up message sent to message recipient "2" (e.g., a filter mechanism). As such, message interface system 48 will generate the appropriate executable file and follow-up message for each message recipient 60. The follow-up messages will be sent according to the previously set schedule. Similar to the original messages, responses, non-responses and statuses of the follow-up messages will be tracked and processed. To this extent, reminder messages can be sent as needed. In addition, the present invention allows for any number of additional follow-up messages to be sent.

Figure 2:
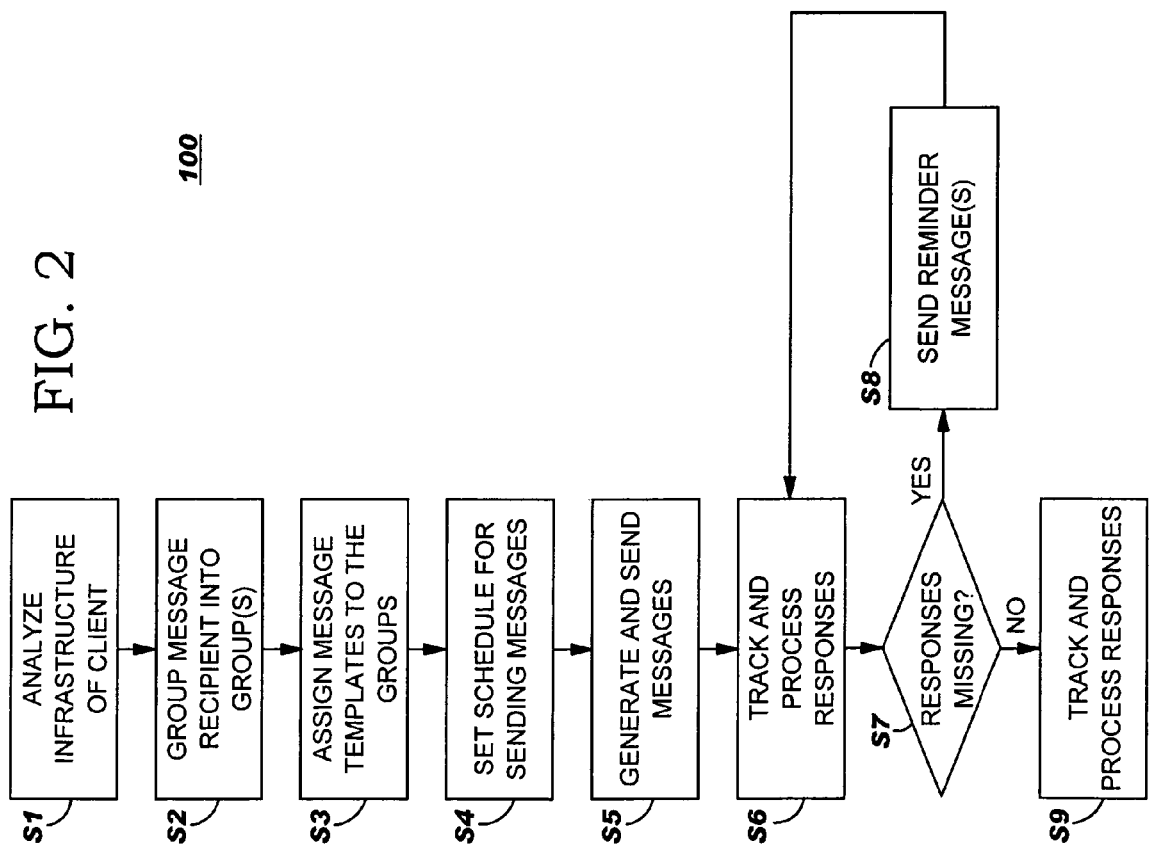
FIG. 2 depicts a flow diagram according to the present invention.

Referring now to FIG. 2, a method flow diagram 100 according to the present invention is shown. First step S1 is to analyze an infrastructure of an enterprise to generate a distribution list of message recipients. As indicated above, this can include analyzing a directory such as an electronic mail directory or the like. Second step S2 is to group the message recipients into a set of mailing groups. In step S3, message templates are assigned to the set of mailing groups. In step S4 a schedule is set for sending messages to the message recipients. Fifth step S5 is to generate and send the messages to the message recipients based on their assigned message templates and the schedule. Sixth step S6 is to track and process responses to the messages. In step S7 it is determined whether any responses to the messages have not been received. If so, reminder messages are sent in step S8. For any responses received, step S9 is to update records associated with the message recipients based on the responses.

While shown and described herein as a method and system for performing an managing communications, it is understood that the invention further provides various alternative embodiments. For example, in one embodiment, the invention provides a computer-readable medium that includes computer program code to enable a computer infrastructure to manage communications. To this extent, the computer-readable medium includes program code that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), on one or more data storage portions of a computing device, such as memory 22 (FIG. 1) and/or storage system 30 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process steps of the invention on a subscription, advertising, and/or fee basis. That is, a service provider, such as an Internet Service Provider, could offer to manage communications as described above. In this case, the service provider can create, maintain, support, etc., a computer infrastructure that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a method for managing communications. In this case, a computer infrastructure can be provided and one or more systems for performing the process steps of the invention can be obtained (e.g., created, purchased, used, modified, etc.) and deployed to the computer infrastructure. To this extent, the deployment of a system can comprise one or more of (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or external I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A system comprising a set of computing devices for managing communications by performing a method comprising:

analyzing an infrastructure of an enterprise to generate a distribution list of message recipients, the message recipients including individuals in a hierarchical organization;

grouping the message recipients into a set of mailing groups based on the hierarchical organization;

assigning message templates to the set of mailing groups;

configuring a schedule for sending messages to the message recipients, wherein the schedule includes a date and a time for sending each of the messages to each of the mailing groups;

generating and sending the messages to the message recipients based on their assigned message templates and the schedule, wherein each of the messages includes an executable file, which when executed, prompts the recipient of the message to input a first set of data;

tracking and processing responses to the messages;

storing a status of the responses in a database, and storing data received in the responses in the database; and updating records associated with the message recipients based on the responses;

wherein the generating and sending of the messages further includes:

generating and sending a follow-up message to at least one of the message recipients based on the schedule and data received in a response from the recipient, the follow-up message including a second executable file, which when executed, prompts the recipient of the message to input a second set of data, the second set of data being a subset of the first set of data; and generating and sending a reminder message to a manager of the recipient in the case that a response to the message has not been received by the component for tracking and processing responses, the reminder message indicating the response from the recipient has not been received, wherein the manager is distinct from the message recipient and is an individual on a level above the recipient in the hierarchical organization, and wherein the manager is within a same mailing group as the recipient;

wherein the communications are managed pursuant to an Information Technology (IT) migration.

2. The system of claim 1, the method further comprising: tracking a status of the responses; and sending reminder messages to the message recipients if the responses are not received in a predetermined amount of time after the messages are sent.

3. The system of claim 1, wherein the infrastructure analyzed is selected from the group consisting of an electronic mail directory, a telephone switch and an electronic company directory.

4. A method for managing communications, comprising:

analyzing an infrastructure of an enterprise to generate a distribution list of message recipients, the message recipients including individuals in a hierarchical organization;

grouping the message recipients into a set of mailing groups, based on the hierarchical organization;

assigning message templates to the set of mailing groups;
configuring a schedule for sending messages to the message recipients, wherein the schedule includes a date and a time for sending each of the messages to each of the mailing groups;

generating and sending the messages to the message recipients using the templates assigned to their respective mailing groups and the schedule, wherein each of the messages includes an executable file, which when executed, prompts the recipient of the message to input a first set of data;

tracking and processing responses to the messages;
storing a status of the responses in a database, and storing data received in the responses in the database; and updating records associated with the message recipients based on the responses; wherein the generating and sending of the messages further includes:

generating and sending a follow-up message to at least one of the message recipients based on the schedule and data received in a response from the recipient, the follow-up message including a second executable file, which when executed, prompts the recipient of the message to input a second set of data, the second set of data being a subset of the first set of data; and generating and sending a reminder message to a manager of the recipient in the case that a response to the message has not been received, the reminder message indicating the response from the recipient has not been received, wherein the manager is distinct from the message recipients recipient and is an individual on a level above the recipient in the hierarchical organization, and wherein the manager is within a same mailing group as the recipient;

wherein the communications are managed pursuant to an Information Technology (IT) migration.

5. The method of claim 4, further comprising:
tracking a status of the responses; and
sending reminder messages to the message recipients if the responses are not received in a predetermined amount of time after the messages are sent.

6. The method of claim 4, wherein the infrastructure is selected from the group consisting of an electronic mail directory, a telephone switch and an electronic company directory.

7. A program product stored on a non-transitory computer readable medium for managing communications, the computer readable storage medium comprising program code for performing the following:

analyzing an infrastructure of an enterprise to generate a distribution list of message recipients, the message recipients including individuals in a hierarchical organization;

grouping the message recipients into a set of mailing groups, based on the hierarchical organization;

assigning message templates to the set of mailing groups;
configuring a schedule for sending messages to the message recipients, wherein the schedule includes a date and a time for sending each of the messages to each of the mailing groups;

generating and sending the messages to the message recipients based on their assigned message templates and the schedule, wherein each of the messages includes an executable file, which when executed, prompts the recipient of the message to input a first set of data;

tracking and processing responses to the messages;
storing a status of the responses in a database, and storing data received in the responses in the database; and
and updating records associated with the message recipients based on the responses;

wherein the program code for generating and sending of the messages further includes program code for:

generating and sending a follow-up message to at least one of the message recipients based on the schedule and data received in a response from the recipient, the follow-up message including a second executable file, which when executed, prompts the recipient of the message to input a second set of data, the second set of data being a subset of the first set of data; and generating and sending a reminder message to a manager of the recipient in the case that a response to the message has not been received, the reminder message indicating the response from the recipient has not been received, wherein the manager is distinct from the message recipient and is an individual on a level above the recipient in the hierarchical organization, and wherein the manager is within a same mailing group as the recipient;

wherein the communications are managed pursuant to an Information Technology (IT) migration.

8. The program product of claim 7, wherein the computer readable medium further comprises program code for performing the following steps:

providing the message templates; tracking a status of the responses; and sending reminder messages to the message recipients if the responses are not received in a predetermined amount of time after the messages are sent.

* * * * *